(No Model.)

J. JAY & N. IDDINGS.
PLANTER.

No. 461,614. Patented Oct. 20, 1891.

Witnesses.
A. Ruppert
H. A. Daniels

Inventors.
John Jay
Nate Iddings
Per
Thomas Simpson
Atty

UNITED STATES PATENT OFFICE.

JOHN JAY AND NATE IDDINGS, OF PLEASANT HILL, OHIO.

PLANTER.

SPECIFICATION forming part of Letters Patent No. 461,614, dated October 20, 1891.

Application filed April 28, 1891. Serial No. 390,751. (No model.)

*To all whom it may concern:*

Be it known that we, JOHN JAY and NATE IDDINGS, citizens of the United States, residing at Pleasant Hill, in the county of Miami and State of Ohio, have invented certain new and useful Improvements in Planters; and we do hereby declare the following to be a full, clear, and exact description of the invention, such as will enable others skilled in the art to which it appertains to make and use the same.

The special object of the invention is to make a planter where the seeding mechanism will be operated from the ground-wheels without throwing the hills of corn out of line, also to prevent the sliding of the wheels when the horses vary in their gait or movements.

Figure 1:
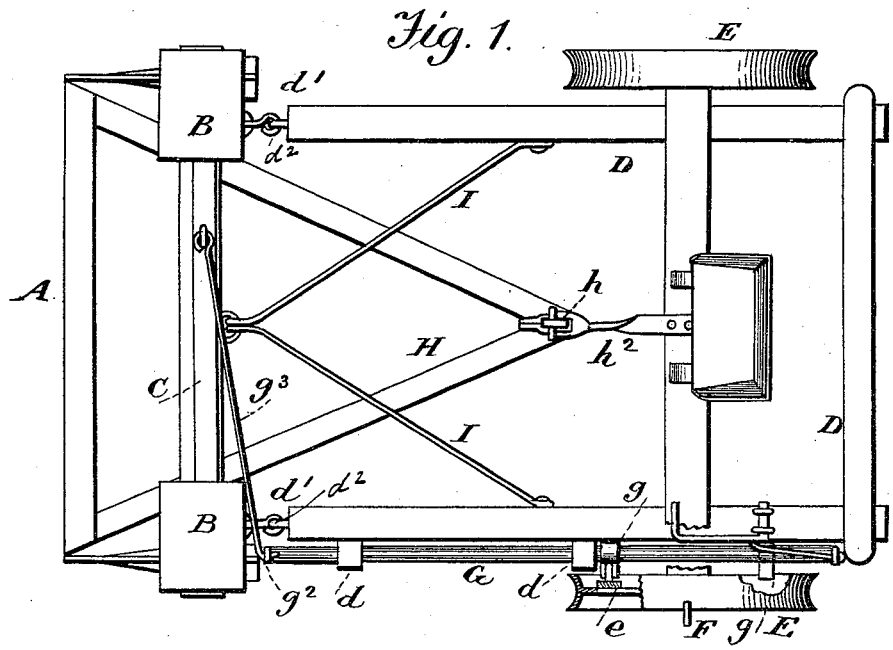
Figure 2:
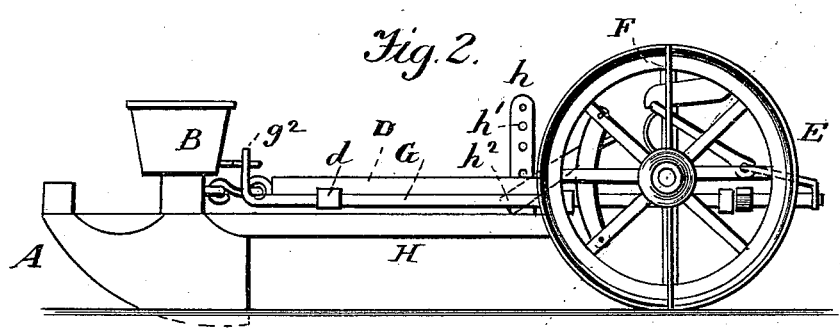
Figure 3:
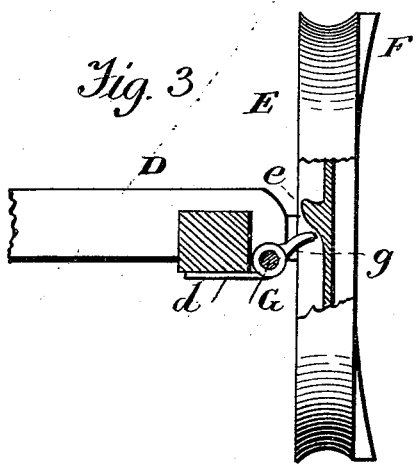

Figure 1 of the drawings is a plan view; Fig. 2, a side elevation, and Fig. 3 a vertical cross-section on an enlarged scale.

In the drawings, A represents the runner-frame carrying the seed-boxes B B and the dropper-slide C in the usual way.

D is the wheel-frame carrying the wheels E E, preferably concaved on their peripheries and provided on the outside of one with the markers F. On one side of frame D are located bearings $d$, in which is vibrated the shaft G, the latter having arms $g\ g'$, which are struck by the wheel-studs $e\ e$, so as to throw it first in one direction and then back. This shaft being connected by an end arm $g^2$ and pivoted rod $g^3$ with the seed-dropper slide C, drops the corn from both of the seed boxes or hoppers B B. This mode of operating the seed-slide is not at all new; but what we have done to improve this operation is to make the wheel studs or lugs $e\ e$ oval in shape and at right angles to the wheel, so as to strike the shaft-arms $g\ g$ at the same angle. By this device the shaft is easily tripped and with only one-fourth of the force required where the arm and lug come squarely together. In the ordinary way of tripping the shaft the wheel slides slightly and looses space, so as to throw the hills out of line.

On or under the runner-frame we make fast the V-shaped frame H, and connect it with the seed-frame by a standard $h$, having several holes $h'$ and a piece $h^2$ on the wheel-frame slotted vertically at its free end. We also connect the sides of the wheel-frame with the middle of the runner-frame by the rods I I, which are eye-jointed to said runner-frame. The ends of the wheel-frame sides $d'\ d'$ are connected by hook and eye $d^2$ with the runner-frame near the seed-boxes B. By coupling the two frames A D in this manner the runner-frame has sufficient play to prevent the wheel from sliding when the horses vary in their movements or do not pull evenly together.

Having thus described all that is necessary to a full understanding of our invention, what we claim as new, and desire to protect by Letters Patent, is—

The runner-frame A and wheel-frame D, flexibly jointed together at $d'\ d'$, in combination with the pivoted rods I I, projecting from the side of the wheel-frame, and the V-shaped frame H, made fast to the runner-frame, the frame H being centrally jointed to wheel-frame to have an up-and-down motion at said joint, whereby all tendency of the cam-wheel to slip, and thus throw the hills out of alignment, is effectually prevented.

In testimony whereof we affix our signatures in presence of two witnesses.

JOHN JAY.
NATE IDDINGS.

Witnesses:
P. J. GOODRICH,
J. U. SMITH.